No. 608,235.  
W. B. SPENCER.  
BICYCLE ATTACHMENT.  
(Application filed Feb. 19, 1897.)  
Patented Aug. 2, 1898.
(No Model.)
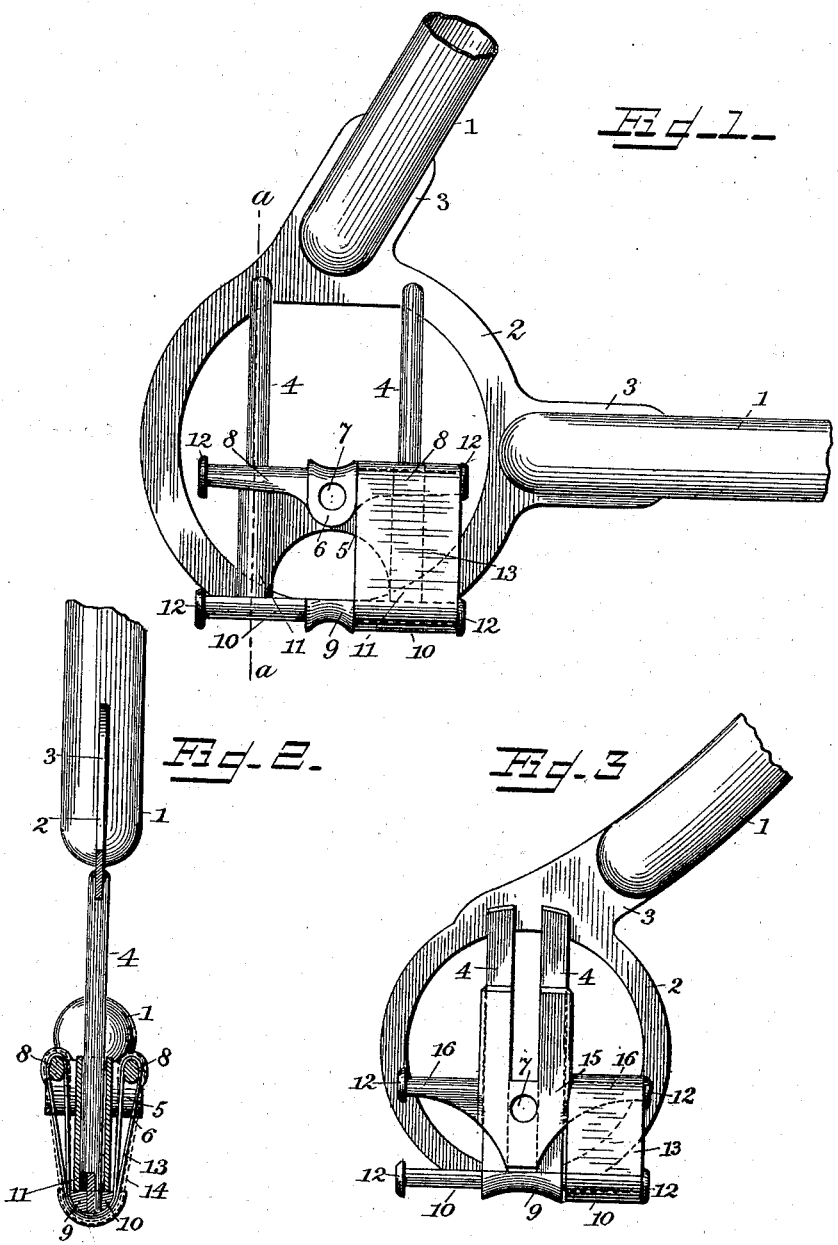
Witnesses  
Chas. H. Ourand  
J. B. Caplinger
Inventor  
William B. Spencer  
By his Attorneys,  
C. A. Snow & Co.
THE NORRIS PETERS CO., PHOTO-LITHO., WASHINGTON, D. C.

UNITED STATES PATENT OFFICE.

WILLIAM BARTON SPENCER, OF CHICAGO, ILLINOIS.

BICYCLE ATTACHMENT.

SPECIFICATION forming part of Letters Patent No. 608,235, dated August 2, 1898.

Application filed February 19, 1897. Serial No. 624,196. (No model.)

*To all whom it may concern:*

Be it known that I, WILLIAM BARTON SPENCER, a citizen of the United States, residing at Chicago, in the county of Cook and State of Illinois, have invented a new and useful Bicycle Attachment, of which the following is a specification.

This invention relates to certain improvements in bicycles, and has for its object to provide cushioned bearings for the wheel-hubs, so as to reduce the shock to the rider resulting from the passage of the wheel over rough roads, stones, &c., so that the riding is rendered less fatiguing and more enjoyable.

The invention consists in certain novel features of the construction, combination, and arrangement of the various parts of the improved mechanism, whereby certain important advantages are attained and the improved cushioned bearings are made simpler, cheaper, and otherwise better adapted for use, all as will be hereinafter fully set forth.

The novel features of the invention will be carefully defined in the claims.

In order that my improvements may be the better understood, I have shown in the accompanying drawings two embodiments of the invention, in which—

Figure 1 is a side elevation showing the first or preferred form of the improved bearing. Fig. 2 is a sectional view taken through the same in the plane indicated by the line *a a* in Fig. 1. Fig. 3 is a view similar to Fig. 1, but showing another form of the improved cushion-bearing.

Referring, primarily, to Figs. 1 and 2, 1 indicates the frame of the bicycle, and 2 indicates a circular forging having projecting portions 3 3 to be brazed to the ends of the bars of the frame, the device, as shown in Figs. 1 and 2, being shown as adapted for use in connection with the rear wheel of the bicycle, although it will be obvious it may as well be applied to the front or steering wheel.

4 4 indicate parallel guide-rods extending vertically across the circular forging 2, to which they are secured at their upper and lower ends, and on said vertical guides 4 is arranged to slide a cross-head 5, having a thickened central part 6, wherein is formed a transverse opening 7 to receive the end of the wheel-axle. The opening 7 may be either slotted or circular, accordingly as the axle is made rounded or flattened at its end.

The thickened central part 6 of the cross-head 5 forms a central projection or shoulder at each side of the cross-head, as clearly shown in Fig. 2, and the front and rear portions of the cross-head are provided with parallel vertical passages or channels to receive the guide-rods 4, so that the cross-head is permitted to move freely up and down upon said guide-rods.

From the front and rear sides of each of the central projections, formed by the thickened central portion 6 of the cross-head 5, extend bearing-arms 8, which project forwardly and rearwardly beyond the guide-rods 4, the arms 8 being spaced apart from the side portions of the cross-head, through which the guide-rods 4 pass, and being alined with each other on opposite sides of the cross-head, as clearly shown in the drawings.

At the lower part of the forging 2 is arranged a bar 9, secured to the lower ends of and arranged in the same plane with the guide-rods 4, and having an enlarged central portion immediately beneath the thickened central portion 6 of the cross-head 5, the end portions of said bar 9 forming arms 10, extending in opposite directions from said enlarged central portion. The upper surface of the bar 9 is made flattened, and upon it are arranged to rest the lower ends of the front and rear portions of the cross-head 5, which portions are made to project down below said central portion, as indicated at 11 in Fig. 1.

The lower arms 10 are made rounded on their under sides, as shown in Fig. 2, and the upper arms 8 are also made rounded upon their upper sides, and each of the arms 8 and 10 is provided at its extremity with an enlargement or head 12, which forms a shoulder at that end of the arm, similar shoulders being formed at the junctions of the inner ends of the arms with the thickened central portions of the cross-head 5 and bar 9.

The arms 8 and 10 are designed to receive springs to form an elastic cushion connecting the cross-head 5 with the forging 2, which is connected fixedly with the frame of the bicycle, these springs being, as shown in the drawings, formed of rubber bands 13, having their opposite end loops or bights engaged over the opposite arms 8 and their central portions carried down and passed over the arms 10, the shoulders on said arms serving to hold said bands against displacement. If desired, a plurality of these elastic bands may be employed on each set of arms, and the bands may be arranged concentrically one over the other, as indicated in dotted lines at 14 in Fig. 2.

By reference to Fig. 2 of the drawings it will be seen that the elastic band is fitted around the lower cross-bar 9 of the carrier or forging 2 and that its looped ends or bights are fitted on the upper cross-head arms 8. By this construction I am enabled to connect each spring to the arms of the cross-head and carrier in a manner to have the spring or band lie wholly on one side of the cross-head and the axle fitted in said cross-head. Each spring is thus independent and complete of itself on one side of the axle, and by arranging said springs on the cross-head on opposite sides of the axle the springs are caused to exert a uniform tension on the cushion device, whereby the cross-head is prevented from displacement with reference to the guides of the carrier or forging.

The lower arm 9 of the carrier or forging is situated in a plane between the upper horizontal arms of the cross-head, and thus the loops or bights of each spring are spread or spaced laterally to enable them to be properly connected to the arms 8 of the cross-head and to provide for easy and ready access thereto in case it is desired to slip the elastic spring or band from the cross-head and replace the same with other springs or bands.

The construction of the carrier or forging in the angular or arched form, as shown by the drawings, is advantageous in that it provides an exceedingly simple and strong construction for joining together diverging bars or members of the rear forks of a bicycle-frame, and said carrier or forging is also advantageous in that it supports all of the working parts of the cushion device and enables the same to be readily applied to bicycle-frames of ordinary construction. In this connection it is proper to state that the cushion device, substantially such as described, may be readily and economically applied to the forks of a bicycle, for which purpose it is only necessary to cut off certain lengths of the bicycle-forks and unite the carrier or forging thereto.

In carrying out my invention each end of each wheel-axle of the bicycle will be provided with an improved cushioning device constructed as above described, and in this way it will be seen that each wheel is permitted to have sufficient vertical play to accommodate itself to inequalities in the road, so that the jolts and shocks which would otherwise be communicated to the frame of the bicycle are taken up by the springs.

The construction shown in Fig. 3 is substantially similar to that above described with the exception that the forging 2 is shown connected with the lower end of one of the front forks of a bicycle and the cross-head 15 is made of less length, the thickened central portion 6 (shown in Fig. 1) being dispensed with and the arms 16, similar in arrangement to the arms 8, being made to extend directly from opposite ends of the cross-head instead of from the thickened central portion thereof, as in the construction first described.

I attach importance to the construction of the cross-head provided at its upper end with the horizontal arms which are spaced laterally in parallel relation to each other to lie on opposite sides of the vertical guide-rods and the single lower cross-bar 9 and to the employment of looped band-springs which pass around the extensions 10 of the lower arm 9 and have their bights or looped ends fitted on the headed end portion of the upper pair of arms 8. This construction and arrangement of parts distributes the strain or pull of the rubber tension-springs in a uniform manner and to good advantage on the arms of the slidable cross-head, so as to prevent unequal strain on the opposite arms and obviate tilting or canting of the cross-head on the guide-rods, and the parts are compactly arranged in a manner to enable easy access to be had to all the arms for the purpose of adjusting the rubber band-springs in case it is desired to remove any worn spring-bands and replace them with new bands. This replacement of the worn bands may be easily and readily effected, because the upper parallel arms are free from engagement with the annular forging and the cross-head, so that the headed ends of the arms are exposed to have the looped ends of the spring-bands slipped thereover.

From the above description it will be seen that the invention is of an extremely simple and inexpensive nature and is especially well adapted for the purposes for which it is designed, and it will also be obvious that the invention is susceptible of some modifications without material departure from its principle and spirit, and for this reason I do not wish to be understood as limiting myself to the precise form and arrangement of the parts herein set forth.

Having thus described my invention, I claim—

1. In a bicycle, the combination with an annular carrier provided with vertical guide-bars, of a horizontal arm 9 united rigidly and centrally to said carrier at the lower edge thereof and having a flat upper side, a rounded lower side, and headed projecting ends; a cross-head fitted slidably to said guide-bars to rest upon the flat upper side of the arm 9 and provided with the horizontal arms 8 which are disposed parallel to each other on opposite sides of the guide-bars and said arm 9, the headed ends of the arms 8 projecting from the cross-head to be free from the same and the annular carrier, and looped band-springs fitted around the extended ends of the arm 9 and having their loops or bights fitted on the extended ends of the arms 8, said band-springs being each arranged wholly on one side of the axle, for the purposes described, substantially as set forth.

2. The combination with an axle and a frame, of an arched carrier provided with vertical central guides and united to said frame to be movable vertically therewith, a cross-head receiving the axle and fitted slidably to the guides, spaced horizontal upper arms rigid with the cross-head and projecting from both sides thereof and arranged on opposite sides of the guides; a lower arm rigid with the carrier and lying in a plane between the upper arms, and looped elastic bands arranged on opposite sides of the axle and connected to the cross-head arms and to the carrier-arms to have each individual spring lie wholly on one side of the axle, substantially as and for the purposes described.

In testimony that I claim the foregoing as my own I have hereto affixed my signature in the presence of two witnesses.

WILLIAM BARTON SPENCER.

Witnesses:
GRACE BENNETT,
LILLIAN STARKWEATHER.